(12) United States Patent
Morizur et al.

(10) Patent No.: US 10,005,903 B2
(45) Date of Patent: Jun. 26, 2018

(54) COMPOSITIONS AND ARTICLES OF MANUFACTURE CONTAINING BRANCHED POLYCARBONATE

(71) Applicant: SABIC GLOBAL TECHNOLOGIES B.V., Bergen Op Zoom (NL)

(72) Inventors: Jean-Francois Morizur, Evansville, IN (US); Yaming Niu, Shanghai (CN); Robert Dirk van de Grampel, Tholen (NL); Miao Shen, Shanghai (CN); Jian Yang, Shanghai (CN)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 0 days. days.

(21) Appl. No.: 15/023,146

(22) PCT Filed: Mar. 9, 2015

(86) PCT No.: PCT/US2015/019368
§ 371 (c)(1),
(2) Date: Mar. 18, 2016

(87) PCT Pub. No.: WO2016/144309
PCT Pub. Date: Sep. 15, 2016

(65) Prior Publication Data
US 2017/0362432 A1     Dec. 21, 2017

(51) Int. Cl.
*C08G 63/02*   (2006.01)
*C08L 69/00*   (2006.01)
*C08K 5/42*    (2006.01)
*C08L 83/04*   (2006.01)

(52) U.S. Cl.
CPC ............ *C08L 69/005* (2013.01); *C08K 5/42* (2013.01); *C08L 83/04* (2013.01)

(58) Field of Classification Search
CPC .................................................... C08L 69/005
USPC ....................................................... 525/67
See application file for complete search history.

(56) References Cited

U.S. PATENT DOCUMENTS

| 6,462,111 | B1 | 10/2002 | Singh et al. |
| 6,987,141 | B2 | 1/2006 | Okamoto et al. |
| 7,405,250 | B2 | 7/2008 | Kim |
| 7,504,452 | B2 | 3/2009 | Hayata et al. |
| 7,652,083 | B2 | 1/2010 | Mullen |
| 7,696,297 | B2 | 4/2010 | Schultz et al. |
| 7,848,025 | B2 | 12/2010 | Hatano et al. |
| 8,030,379 | B2 | 10/2011 | Nodera et al. |
| 8,084,134 | B2 | 12/2011 | Malinoski et al. |
| 2009/0062438 | A1 | 3/2009 | Van De Grampel et al. |
| 2011/0028615 | A1 | 2/2011 | Li et al. |
| 2012/0202034 | A1 | 8/2012 | Morizur et al. |
| 2014/0371360 | A1 | 12/2014 | Zheng et al. |

FOREIGN PATENT DOCUMENTS

| EP | 1624025 A1 | 8/2005 |
| EP | 2066728 B1 | 6/2007 |
| EP | 2578636 A1 | 5/2011 |
| EP | 2395052 A1 | 12/2011 |
| JP | 2010248527 A | 11/2010 |
| KR | 2011076547 A | 7/2011 |

OTHER PUBLICATIONS

International Search Report for International Application No. PCT/US2015/019368; International Filing Date Mar. 9, 2015; dated Nov. 4, 2015; 4 pages.
Qian, Y., Wei, P., Zhao, X., Jiang, P. and Yu, H. (2011), Flame retardancy and thermal stability of polyhedral oligomeric silsesquioxane nanocomposites. Fire and Materials. doi: 10.1002/fam.1126, 3 pages.
Siloxane Modification of Polycarbonate for Superior Flow and Impact Toughness, 2012, www.scienceindex.com, 3 pages.
Written Opinion for International Application No. PCT/US2015/019368; International Filing Date Mar. 9, 2015; dated Nov. 4, 2015; 5 pages.

*Primary Examiner* — Terressa Boykin
(74) *Attorney, Agent, or Firm* — Cantor Colburn LLP

(57) ABSTRACT

A thermoplastic composition comprises: 35 to 45 weight percent of a branched, end capped polycarbonate, 55 to 70 weight percent of a poly(aliphatic ester-carbonate) having a weight average molecular weight of 15,000 to 25,000, a non-flourinated sulfonate salt flame retardant and a polysiloxane. Weight percent is based on the combined weight of the branched, end capped polycarbonate and poly(aliphatic ester-carbonate).

20 Claims, No Drawings

COMPOSITIONS AND ARTICLES OF MANUFACTURE CONTAINING BRANCHED POLYCARBONATE

CROSS REFERENCE TO RELATED APPLICATIONS

This application is a National Stage application of PCT/US15/19368, filed Mar. 9, 2015, which is incorporated by reference in its entirety herein.

BACKGROUND OF THE INVENTION

This disclosure relates to polycarbonate compositions, and in particular to flame retardant polycarbonate compositions and articles made therefrom.

Polycarbonates are useful in the manufacture of articles and components for a wide range of applications, from automotive parts to electronic appliances. Because of their broad use, particularly in electronic applications, it is desirable to provide flame retardant polycarbonates with ductility and high flow.

There accordingly remains a need in the art for flame retardant polycarbonate compositions that have ductility and flame retardance even at reduced thicknesses. It would be a further advantage if the flame retardant compositions were transparent as well.

SUMMARY OF THE INVENTION

The above-described and other deficiencies of the art are met by a thermoplastic composition comprising: 35 to 45 weight percent of a branched, end capped polycarbonate, 55 to 65 weight percent of a poly(aliphatic ester-carbonate) having a weight average molecular weight of 15,000 to 25,000, a non-flourinated sulfonate salt flame retardant and a polysiloxane. Weight percent is based on the combined weight of the branched, end capped polycarbonate and poly(aliphatic ester-carbonate).

In another embodiment a thermoplastic composition comprises: 30 to 45 weight percent of a branched, end capped polycarbonate, 55 to 70 weight percent of a combination of a first poly(aliphatic ester-carbonate) having a weight average molecular weight of 15,000 to 25,000 and a second poly(aliphatic ester-carbonate) having a weight average molecular weight of 30,000 to 40,000, a non-flourinated sulfonate salt flame retardant and a polysiloxane. Weight percent is based on the combined weight of the branched, end capped polycarbonate and poly(aliphatic ester-carbonate).

In yet another embodiment, an article comprises one of the above-described thermoplastic composition.

The above described and other features are exemplified by the following detailed description, examples, and claims.

DETAILED DESCRIPTION OF THE INVENTION

The above described composition surprisingly achieves the combined goals of flame retardance (UL94 rating of V0 or V1 at thicknesses of 3.0 millimeters (mm) or less, more specifically 2.5-3.0 mm), a melt volume flow rate of 15 to 40 $cm^3/10$ min, and a multi-axial impact ductility greater than or equal to 80% at 23° C. Additionally, the composition can have a haze value less than or equal to 1.5% and a light transmittance greater than or equal to 85% at a thickness of 3.2 mm.

Unless otherwise noted, the described melt volume flow rates are measured at 300° C. under a load of 1.2 kg, according to ASTM D1238-04 at 6 minutes. Similarly, the mult-axial impact ductility values are determined accordingly to ASTM D3763 at 23° C. and 3.2 mm. The Notched Izod impact values are determined according to ASTM D256 at 23° C. and 3.2 mm. Haze and light transmittance are determined according to ASTM D1003 at a thickness of 3.2 mm.

"Polycarbonate" as used herein means a polymer having repeating structural carbonate units of formula (1)

in which at least 60 percent of the total number of $R^1$ groups contain aromatic moieties and the balance thereof are aliphatic, alicyclic, or aromatic. In an embodiment, each $R^1$ is a $C_{6-30}$ aromatic group, that is, contains at least one aromatic moiety. $R^1$ can be derived from an aromatic dihydroxy compound of the formula HO—$R^1$—OH, in particular of formula (2)

$$HO-A^1-Y^1-A^2-OH \qquad (2)$$

wherein each of $A^1$ and $A^2$ is a monocyclic divalent aromatic group and $Y^1$ is a single bond or a bridging group having one or more atoms that separate $A^1$ from $A^2$. In an embodiment, one atom separates $A^1$ from $A^2$. Specifically, each $R^1$ can be derived from a bisphenol of formula (3)

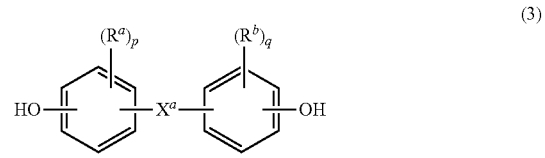

wherein $R^a$ and $R^b$ are each independently a halogen, $C_{1-12}$ alkoxy, or $C_{1-12}$ alkyl, and p and q are each independently integers of 0 to 4. It will be understood that when p or q is less than 4, the valence of each carbon of the ring is filled by hydrogen. Also in formula (3), $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group. In an embodiment, the bridging group $X^a$ is single bond, —O—, —S—, —S(O)—, —S(O)$_2$—, —C(O)—, or a $C_{1-18}$ organic group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. In an embodiment, p and q is each 1, and $R^a$ and $R^b$ are each a $C_{1-3}$ alkyl group, specifically methyl, disposed meta to the hydroxy group on each arylene group.

In an embodiment, $X^a$ is a substituted or unsubstituted $C_{3-18}$ cycloalkylidene, a $C_{1-25}$ alkylidene of formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl, or a group of the formula —C(=R$^e$)— wherein R$^e$ is a divalent C$_{1-12}$ hydrocarbon group. Groups of this type include methylene, cyclohexylmethylene, ethylidene, neopentylidene, and isopropylidene, as well as 2-[2.2.1]-bicycloheptylidene, cyclohexylidene, cyclopentylidene, cyclododecylidene, and adamantylidene.

In another embodiment, X$^a$ is a C$_{1-18}$ alkylene, a C$_{3-18}$ cycloalkylene, a fused C$_{6-18}$ cycloalkylene, or a group of the formula —B$^1$-G-B$^2$— wherein B$^1$ and B$^2$ are the same or different C$_{1-6}$ alkylene and G is a C$_{3-12}$ cycloalkylidene or a C$_{6-16}$ arylene. For example, X$^a$ can be a substituted C$_{3-18}$ cycloalkylidene of formula (4)

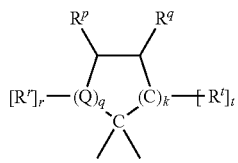

(4)

wherein R$^r$, R$^p$, R$^q$, and R$^t$ are each independently hydrogen, halogen, oxygen, or C$_{1-12}$ hydrocarbon groups; Q is a direct bond, a carbon, or a divalent oxygen, sulfur, or —N(Z)— where Z is hydrogen, halogen, hydroxy, C$_{1-12}$ alkyl, C$_{1-12}$ alkoxy, or C$_{1-12}$ acyl; r is 0 to 2, t is 1 or 2, q is 0 or 1, and k is 0 to 3, with the proviso that at least two of R$^r$, R$^p$, R$^q$, and R$^t$ taken together are a fused cycloaliphatic, aromatic, or heteroaromatic ring. It will be understood that where the fused ring is aromatic, the ring as shown in formula (4) will have an unsaturated carbon-carbon linkage where the ring is fused. When k is one and i is 0, the ring as shown in formula (4) contains 4 carbon atoms, when k is 2, the ring as shown in formula (4) contains 5 carbon atoms, and when k is 3, the ring contains 6 carbon atoms. In an embodiment, two adjacent groups (e.g., R$^q$ and R$^t$ taken together) form an aromatic group, and in another embodiment, R$^q$ and R$^t$ taken together form one aromatic group and R$^r$ and R$^p$ taken together form a second aromatic group. When R$^q$ and R$^t$ taken together form an aromatic group, R$^p$ can be a double-bonded oxygen atom, i.e., a ketone.

Bisphenols wherein X$^a$ is a cycloalkylidene of formula (4) can be used in the manufacture of polycarbonates containing phthalimidine carbonate units of formula (1a)

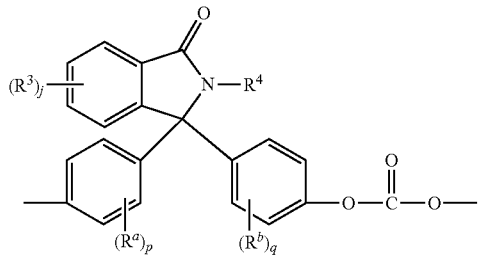

(1a)

wherein R$^a$, R$^b$, p, and q are as in formula (3), R$^3$ is each independently a C$_{1-6}$ alkyl, j is 0 to 4, and R$_4$ is hydrogen, C$_{1-6}$ alkyl, or a substituted or unsubstituted phenyl, for example a phenyl substituted with up to five C$_{1-6}$ alkyls. For example, the phthalimidine carbonate units are of formula (1b)

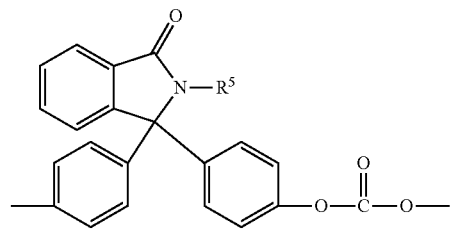

(1b)

wherein R$^5$ is hydrogen, phenyl optionally substituted with up to five 5 C$_{1-6}$ alkyls, or C$_{1-4}$ alkyl. In an embodiment in formula (1b), R$^5$ is hydrogen, methyl, or phenyl, specifically phenyl. Carbonate units (1b) wherein R$^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Other bisphenol carbonate repeating units of this type are the isatin carbonate units of formula (1c) and (1d)

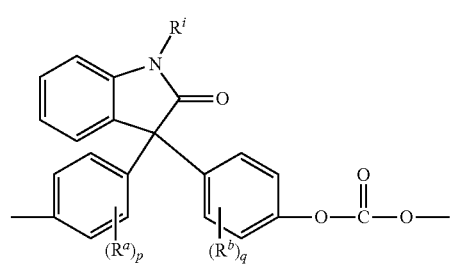

(1c)

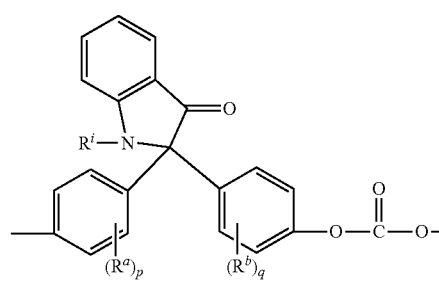

(1d)

wherein R$^a$ and R$^b$ are each independently a halogen, C$_{1-12}$ alkoxy, or C$_{1-12}$ alkyl, p and q are each independently 0 to 4, and R$^i$ is C$_{1-12}$ alkyl, phenyl optionally substituted with 1 to 5 C$_{1-10}$ alkyl, or benzyl optionally substituted with 1 to 5 C$_{1-10}$ alkyl. In an embodiment, R$^a$ and R$^b$ are each methyl, p and q are each independently 0 or 1, and R$^i$ is C$_{1-4}$ alkyl or phenyl.

Other examples of bisphenol carbonate units derived from of bisphenols (3) wherein X$^a$ is a substituted or unsubstituted C$_{3-18}$ cycloalkylidene (4) include the cyclohexylidene-bridged, alkyl-substituted bisphenol of formula (1e)

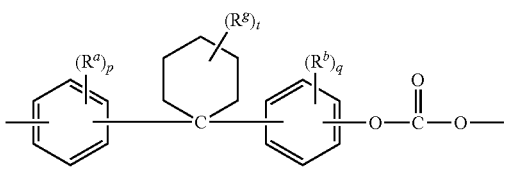

(1e)

wherein $R^a$ and $R^b$ are each independently $C_{1-12}$ alkyl, $R^g$ is $C_{1-12}$ alkyl, p and q are each independently 0 to 4, and t is 0 to 10. In a specific embodiment, at least one of each of $R^a$ and $R^b$ are disposed meta to the cyclohexylidene bridging group. In an embodiment, $R^a$ and $R^b$ are each independently $C_{1-4}$ alkyl, $R^g$ is $C_{1-4}$ alkyl, p and q are each 0 or 1, and t is 0 to 5. In another specific embodiment, $R^a$, $R^b$, and $R^g$ are each methyl, p and q are each 0 or 1, and t is 0 or 3, specifically 0.

Examples of other bisphenol carbonate units derived from bisphenol (3) wherein $X^a$ is a substituted or unsubstituted $C_{3-18}$ cycloalkylidene include adamantyl units of formula (1f) and fluorenyl units of formula (1g)

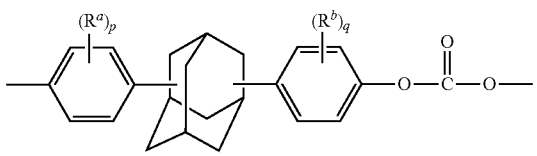

(1f)

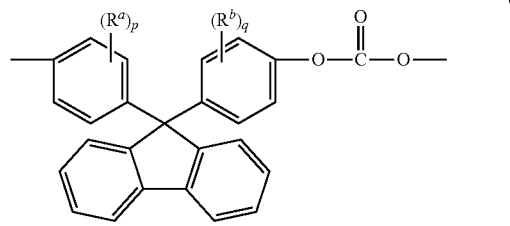

(1g)

wherein $R^a$ and $R^b$ are each independently $C_{1-12}$ alkyl, and p and q are each independently 1 to 4. In a specific embodiment, at least one of each of $R^a$ and $R^b$ are disposed meta to the cycloalkylidene bridging group. In an embodiment, $R^a$ and $R^b$ are each independently $C_{1-3}$ alkyl, and p and q are each 0 or 1; specifically, $R^a$, $R^b$ are each methyl, p and q are each 0 or 1, and when p and q are 1, the methyl group is disposed meta to the cycloalkylidene bridging group. Carbonates containing units (1a) to (1g) are useful for making polycarbonates with high glass transition temperatures (Tg) and high heat distortion temperatures.

Other useful dihydroxy compounds of the formula HO—$R^1$—OH include aromatic dihydroxy compounds of formula (6)

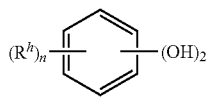

(6)

wherein each $R^h$ is independently a halogen atom, $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4. The halogen is usually bromine.

Some illustrative examples of specific dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantane, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalimide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, or the like, or combinations comprising at least one of the foregoing dihydroxy compounds.

Specific examples of bisphenol compounds of formula (3) include 1,1-bis(4-hydroxyphenyl) methane, 1,1-bis(4-hydroxyphenyl) ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-2-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds can also be used. In a specific embodiment, the polycarbonate is a linear homopolymer derived from bisphenol A, in which each of $A^1$ and $A^2$ is p-phenylene and $Y^1$ is isopropylidene in formula (3).

The branched, end capped polycarbonate can have an intrinsic viscosity, as determined in chloroform at 25° C., of 0.3 to 1.5 deciliters per gram (dl/gm), specifically 0.45 to 1.0 dl/gm. The branched end capped polycarbonate can have a weight average molecular weight of 10,000 to 200,000 Daltons, specifically 20,000 to 100,000 Daltons, as measured by gel permeation chromatography (GPC), using a crosslinked styrene-divinylbenzene column and calibrated to polycarbonate references. GPC samples are prepared at a concentration of 1 mg per ml, and are eluted at a flow rate of 1.5 ml per minute.

The branched end capped polycarbonate comprises units as described above; greater than or equal to 3 mole %, based on the total moles of the polycarbonate, of moieties derived from a branching agent; and end-capping groups derived from an end-capping agent having a pKa between 8.3 and 11. The branching agent can comprise trimellitic trichloride, 1,1,1-tris(4-hydroxyphenyl)ethane or a combination of trimellitic trichloride and 1,1,1-tris(4-hydroxyphenyl)ethane, and the end-capping agent is phenol or a phenol containing a substituent of cyano group, aliphatic groups, olefinic groups, aromatic groups, halogens, ester groups, ether groups, or a combination comprising at least one of the foregoing. In a specific embodiment, the end-capping agent is phenol, p-t-butylphenol, p-methoxyphenol, p-cyanophenol, p-cumylphenol, or a combination comprising at least one of the foregoing.

In some embodiments, the branched end capped polycarbonate is a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade mark LEXAN CFR from the Innovative Plastics division of SABIC.

The poly(aliphatic ester-carbonate), further contains, in addition to recurring carbonate units of formula (1), repeating units of formula (7)

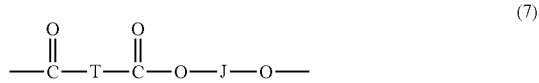

wherein J is a divalent group derived from a dihydroxy compound (including a reactive derivative thereof), and can be, for example, a $C_{2-10}$ alkylene, a $C_{6-20}$ cycloalkylene, a $C_{6-20}$ arylene, or a polyoxyalkylene in which the alkylene groups contain 2 to 6 carbon atoms, specifically 2, 3, or 4 carbon atoms; and T is a divalent group derived from a linear aliphatic dicarboxylic acid (including a reactive derivative thereof), and can be, for example, a $C_{2-20}$ alkylene.

In an embodiment, J is a $C_{2-30}$ alkylene group having a straight chain, branched chain, or cyclic (including polycyclic) structure, for example ethylene, n-propylene, i-propylene, 1,4-butylene, 1,6-cyclohexylene, or 1,4-methylenecyclohexane. In another embodiment, J is derived from a bisphenol of formula (3), e.g., bisphenol A. In another embodiment, J is derived from an aromatic dihydroxy compound of formula (6), e.g, resorcinol.

A specific example of a poly(aliphatic ester-carbonate) is a poly(aliphatic ester-carbonate) derived from a linear $C_{6-20}$ aliphatic dicarboxylic acid (which includes a reactive derivative thereof), specifically a linear $C_6$-$C_{12}$ aliphatic dicarboxylic acid (which includes a reactive derivative thereof). Specific dicarboxylic acids include n-hexanedioic acid (adipic acid), n-decanedioic acid (sebacic acid), and alpha, omega-$C_{12}$ dicarboxylic acids such as dodecanedioic acid (DDDA). A specific poly(aliphatic ester-carbonate) is of formula (8):

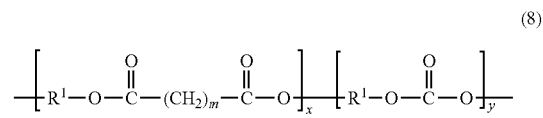

wherein each $R^1$ can be the same or different, and is as described in formula (1), m is 4 to 18, specifically 4 to 10, and the average molar ratio of ester units to carbonate units x:y is 99:1 to 1:99, including 13:87 to 2:98, or 9:91 to 2:98, or 8:92 to 2:98. In a specific embodiment, the poly(aliphatic ester-carbonate) comprises bisphenol A sebacate ester units and bisphenol A carbonate units, having, for example an average molar ratio of x:y of 2:98 to 8:92, for example 6:94. Such poly(aliphatic ester-carbonate)s are commercially available as LEXAN HFD from the Innovative Plastics Division of SABIC (LEXAN is a trademark of SABIC IP B. V.).

In some embodiments the poly(aliphatic ester-carbonate) can have a weight average molecular weight of 15,000 to 25,000 Dalton (Da) (measured by GPC based on BPA polycarbonate standards).

In some embodiments the thermoplastic composition comprises two poly(aliphatic ester-carbonate)s. The first poly(aliphatic ester-carbonate) can have a weight average molecular weight of 15,000 to 25,000 Dalton (Da) and the second poly(aliphatic ester-carbonate) can have a weight average molecular weight of 30,000 to 40,000 Da. When two poly(aliphatic ester-carbonate)s are used the weight ratio of the first poly(aliphatic ester-carbonate) to the second poly(aliphatic ester-carbonate) can be 3:4 to 5:2.

Polycarbonates [and poly(aliphatic ester-carbonate)s] can be manufactured by processes such as interfacial polymerization and melt polymerization.

1. Interfacial Polymerization

Although the reaction conditions for interfacial polymerization can vary, an exemplary process generally involves dissolving or dispersing a dihydroxy compound in aqueous NaOH or KOH, adding the resulting mixture to a water-immiscible solvent, and contacting the reactants with a carbonate precursor in the presence of a catalyst such as, for example, a tertiary amine or a phase transfer catalyst, under controlled pH conditions, e.g., 8 to 10.

The water-immiscible solvent can be, for example, methylene chloride, 1,2-dichloroethane, chlorobenzene, toluene, and the like.

Exemplary carbonate precursors include a carbonyl halide such as carbonyl bromide or carbonyl chloride (phosgene) a bishaloformate of a dihydroxy compound (e.g., the bischloroformate of bisphenol A, hydroquinone ethylene glycol, neopentyl glycol, or the like), and diaryl carbonates. Combinations comprising at least one of the foregoing types of carbonate precursors can also be used. The diaryl carbonate ester can be diphenyl carbonate, or an activated diphenyl carbonate having electron-withdrawing substituents on the each aryl, such as bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl) carboxylate, bis(4-acetylphenyl) carboxylate, or a combination comprising at least one of the foregoing.

In the manufacture of poly(ester-carbonate)s by interfacial polymerization, rather than using the dicarboxylic acid or diol directly, the reactive derivatives of the diacid or diol, such as the corresponding acid halides, in particular the acid dichlorides and the acid dibromides can be used. Thus, for example instead of using isophthalic acid, terephthalic acid, or a combination comprising at least one of the foregoing acids, isophthaloyl dichloride, terephthaloyl dichloride, or a combination comprising at least one of the foregoing dichlorides can be used.

Among tertiary amines that can be used as catalysts in interfacial polymerization are aliphatic tertiary amines such as triethylamine and tributylamine, cycloaliphatic tertiary amines such as N,N-diethyl-cyclohexylamine, and aromatic tertiary amines such as N,N-dimethylaniline. Among the phase transfer catalysts that can be used are catalysts of the formula $(R^3)_4Q^+X$, wherein each $R^3$ is the same or different, and is a $C_{1-10}$ alkyl; Q is a nitrogen or phosphorus atom; and X is a halogen atom or a $C_{1-8}$ alkoxy or $C_{6-18}$ aryloxy. Exemplary phase transfer catalysts include $(CH_3(CH_2)_3)_4NX$, $(CH_3(CH_2)_3)_4PX$, $(CH_3(CH_2)_5)_4NX$, $(CH_3(CH_2)_6)_4NX$, $(CH_3(CH_2)_4)_4NX$, $CH_3(CH_3(CH_2)_3)_3NX$, and $CH_3(CH_3(CH_2)_2)_3NX$, wherein X is Cl$^-$, Br$^-$, a $C_{1-8}$ alkoxy or a $C_{6-18}$ aryloxy. An effective amount of a phase transfer catalyst can be 0.1 to 10 wt %, or 0.5 to 2 wt %, each based on the weight of dihydroxy compound in the phosgenation mixture.

2. Melt Polymerization

Alternatively, melt processes can be used to make the polycarbonates. Generally, in the melt polymerization process, polycarbonates can be prepared by co-reacting, in a molten state, a dihydroxy reactant and a diaryl carbonate ester in the presence of a transesterification catalyst. The reaction can be carried out in typical polymerization equipment, such as a continuously stirred reactor (CSTR), plug flow reactor, wire wetting fall polymerizers, free fall polymerizers, wiped film polymerizers, BANBURY mixers, single or twin screw extruders, or a combination of the foregoing. Volatile monohydric phenol is removed from the molten reactants by distillation and the polymer is isolated as a molten residue. Melt polymerization can be conducted as a batch process or as a continuous process. In either case, the melt polymerization conditions used can comprise two or more distinct reaction stages, for example, a first reaction stage in which the starting dihydroxy aromatic compound and diaryl carbonate are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of 1,000 to 7,500 Daltons. In one or more subsequent polymerization stages the number average molecular weight (Mn) of the polycarbonate is increased to between 8,000 and 25,000 Daltons (using polycarbonate standard). Typically, solvents are not used in the process, and the reactants dihydroxy aromatic compound and the diaryl carbonate are in a molten state. The reaction temperature can be 100° C. to 350° C., specifically 180° C. to 310° C. The pressure can be at atmospheric pressure, supra-atmospheric pressure, or a range of pressures from atmospheric pressure to 15 torr in the initial stages of the reaction, and at a reduced pressure at later stages, for example 0.2 to 15 torr. The reaction time is generally 0.1 hours to 10 hours.

Catalysts used in the melt transesterification polymerization production of polycarbonates can include alpha or beta catalysts. Beta catalysts are typically volatile and degrade at elevated temperatures. Beta catalysts are therefore preferred for use at early low-temperature polymerization stages. Alpha catalysts are typically more thermally stable and less volatile than beta catalysts.

The alpha catalyst can comprise a source of alkali or alkaline earth ions. The sources of these ions include alkali metal hydroxides such as lithium hydroxide, sodium hydroxide, and potassium hydroxide, as well as alkaline earth hydroxides such as magnesium hydroxide and calcium hydroxide. Other possible sources of alkali and alkaline earth metal ions include the corresponding salts of carboxylic acids (such as sodium acetate) and derivatives of ethylene diamine tetraacetic acid (EDTA) (such as EDTA tetrasodium salt, and EDTA magnesium disodium salt). Other alpha transesterification catalysts include alkali or alkaline earth metal salts of carbonate, such as $Cs_2CO_3$, $NaHCO_3$, and $Na_2CO_3$, and the like, non-volatile inorganic acid such as $NaH_2PO_3$, $NaH_2PO_4$, $Na_2HPO_3$, $KH_2PO_4$, $CsH_2PO_4$, $Cs_2HPO_4$, and the like, or mixed salts of phosphoric acid, such as $NaKHPO_4$, $CsNaHPO_4$, $CsKHPO_4$, and the like. Combinations comprising at least one of any of the foregoing catalysts can be used.

Possible beta catalysts can comprise a quaternary ammonium compound, a quaternary phosphonium compound, or a combination comprising at least one of the foregoing. The quaternary ammonium compound can be a compound of the structure $(R^4)_4N^+X^-$, wherein each $R^4$ is the same or different, and is a $C_{1-20}$ alkyl, a $C_{4-20}$ cycloalkyl, or a $C_{4-20}$ aryl; and X$^-$ is an organic or inorganic anion, for example a hydroxide, halide, carboxylate, sulfonate, sulfate, formate, carbonate, or bicarbonate. Examples of organic quaternary ammonium compounds include tetramethyl ammonium hydroxide, tetrabutyl ammonium hydroxide, tetramethyl ammonium acetate, tetramethyl ammonium formate, tetrabutyl ammonium acetate, and combinations comprising at least one of the foregoing. Tetramethyl ammonium hydroxide is often used. The quaternary phosphonium compound can be a compound of the structure $(R^5)_4P^+X^-$, wherein each $R^5$ is the same or different, and is a $C_{1-20}$ alkyl, a $C_{4-20}$ cycloalkyl, or a $C_{4-20}$ aryl; and X$^-$ is an organic or inorganic anion, for example a hydroxide, phenoxide, halide, carboxylate such as acetate or formate, sulfonate, sulfate, formate, carbonate, or bicarbonate. Where X$^-$ is a polyvalent anion such as carbonate or sulfate it is understood that the positive and negative charges in the quaternary ammonium and phosphonium structures are properly balanced. For example, where $R^{20}$ to $R^{23}$ are each methyls and X$^-$ is carbonate, it is understood that X$^-$ represents $2(CO_3^{-2})$. Examples of organic quaternary phosphonium compounds include tetramethyl phosphonium hydroxide, tetramethyl phosphonium acetate, tetramethyl phosphonium formate, tetrabutyl phosphonium hydroxide, tetrabutyl phosphonium acetate (TBPA), tetraphenyl phosphonium acetate, tetraphenyl phosphonium phenoxide, and combinations comprising at least one of the foregoing. TBPA is often used.

The amount of alpha and beta catalyst used can be based upon the total number of moles of dihydroxy compound used in the polymerization reaction. When referring to the ratio of beta catalyst, for example, a phosphonium salt, to all dihydroxy compounds used in the polymerization reaction, it is convenient to refer to moles of phosphonium salt per mole of the dihydroxy compound, meaning the number of moles of phosphonium salt divided by the sum of the moles of each individual dihydroxy compound present in the reaction mixture. The alpha catalyst can be used in an amount sufficient to provide $1\times10^{-2}$ to $1\text{--}10^{-8}$ moles, specifically, $1\times10^{-4}$ to $1\times10^{-7}$ moles of metal per mole of the dihydroxy compounds used. The amount of beta catalyst (e.g., organic ammonium or phosphonium salts) can be $1\times10^{-2}$ to $1\times10^{-5}$, specifically $1\times10^{-3}$ to $1\times10^{-4}$ moles per total mole of the dihydroxy compounds in the reaction mixture. Quenching of the transesterification catalysts and any reactive catalysts residues with an acidic compound after polymerization is completed can also be useful in some melt polymerization processes. Removal of catalyst residues and/or quenching agent and other volatile residues from the melt polymerization reaction after polymerization is completed can also be useful in some melt polymerization processes.

A quencher can be added, for example to a finishing extruder to reduce the activity of the catalyst. Quenching agents include boric acid esters (e.g., $B(OCH_3)_3$, $B(OCH_2CH_3)_3$, and $B(OC_6H_6)_3$, zinc borate, boron phosphate, aluminum stearate, aluminum silicate, zirconium carbonate, zirconium $C_1$-$C_{12}$ alkoxides, zirconium hydroxycarboxylates, gallium phosphide, gallium antimonide, germanium oxide, $C_1$-$C_{32}$ organogermanium compounds, $C_4$-$C_{32}$ tetraorganotin tin compound, $C_6$-$C_{32}$ hexaorganotin compound (e.g., $[(C_6H_6O)Sn(CH_2CH_2CH_2CH_3)_2]_2O)$, $Sb_2O_3$, antimony oxide, $C_1$-$C_{32}$ alkylantimony, bismuth oxide, $C_1$-$C_{12}$ alkylbismuth, zinc acetate, zinc stearate, $C_1$-$C_{32}$ alkoxytitanium, and titanium oxide, phosphoric acid, phosphorous acid, hypophosphorous acid, pyrophosphoric acid, polyphosphoric acid, boric acid, hydrochloric acid, hydrobromic acid, sulfuric acid, sulfurous acid, adipic acid, azelaic acid, dodecanoic acid, L-ascorbic acid, aspartic acid, benzoic acid, formic acid, acetic acid, citric acid, glutamic acid, salicylic acid, nicotinic acid, fumaric acid, maleic acid, oxalic acid, benzenesulfinic acid, $C_1$-$C_{12}$ dialkyl sulfates (e.g., dimethyl sulfate and dibutyl sulfate), alkyl sulfonic esters of the formula $R_1SO_3R_2$ wherein $R_1$ is hydrogen, $C_1$-$C_{12}$ alkyl, $C_6$-$C_{18}$ aryl, or $C_7$-$C_{19}$ alkylaryl, and $R_2$ is $C_1$-$C_{12}$ alkyl, $C_6$-$C_{18}$ aryl, or $C_7$-$C_{19}$ alkylaryl (e.g., benzenesulfonate, p-toluenesulfonate, methylbenzene sulfonate, ethylbenzene sulfonate, n-butyl benzenesulfonate, octyl benzenesulfonate and phenyl benzenesulfonate, methyl p-toluenesulfonate, ethyl p-toluenesulfonate, n-butyl p-toluene sulfonate, octyl p-toluenesulfonate and phenyl p-toluenesulfonate, in particular alkyl tosylates such as n-butyl tosylate), sulfonic acid phosphonium salts of the formula $(R^aSO_3^-)(PR^b_4)^+$ wherein $R^a$ is hydrogen, $C_1$-$C_{12}$ alkyl, $C_6$-$C_{18}$ aryl, or $C_7$-$C_{19}$ alkylaryl, and each $R^b$ is independently hydrogen, $C_1$-$C_{12}$ alkyl or $C_6$-$C_{18}$ aryl, sulfonic acid derivatives of the formula $A^1$-$(Y^1$—$SO_3X^1)_m$ wherein $A^1$ is a $C_1$-$C_{40}$ hydrocarbon group having a valence of in, $Y^1$ is a single bond or an oxygen atom, $X^1$ is a secondary or tertiary alkyl group of the formula —$CR^{15}R^{16}R^{17}$, a metal cation of one equivalent, an ammonium cation (e.g, $NR^b_3{}^+$ wherein each $R^b$ is independently hydrogen, $C_1$-$C_{12}$ alkyl or $C_6$-$C_{18}$ aryl), or a phosphonium (e.g, $PR^b_4{}^+$ wherein each $R^b$ is independently hydrogen, $C_1$-$C_{12}$ alkyl or $C_6$-$C_{18}$ aryl) wherein $R^{15}$ is a hydrogen atom or an alkyl group having 1 to 5 carbon atoms, $R^{16}$ is a hydrogen atom, a phenyl group or an alley group having 1 to 5 carbon atoms, and $R^{17}$ is the same as or different from $R^{15}$ and has the same definition as $R^{15}$, provided that two of $R^{15}$, $R^{16}$, and $R^{17}$ cannot be hydrogen atoms, and m is an integer of 1 to 4, provided that when $Y^1$ is a single bond, all of $X^1$ in an amount of m cannot be metal cations of one equivalent, a compound of the formula $^+X^2$-$A^2$-$Y^1$—$SO_3^-$ wherein $A^2$ is a divalent hydrocarbon group, $^+X^2$ is a secondary, tertiary or quaternary ammonium cation or a secondary (e.g., tertiary or quaternary phosphonium cation, and $Y^1$ is a single bond or an oxygen atom, a compound of the formula $A^3$-$(^+X^3)_n$.(R—$Y^1$—$SO_3^-)_n$ wherein $A^3$ is a $C_1$-$C_{40}$ hydrocarbon group having a valence of n, $^+X^3$ is a secondary, tertiary or quaternary ammonium cation (e.g., $NR^b_3{}^+$ wherein each $R^b$ is independently hydrogen, $C_1$-$C_{12}$ alkyl or $C_6$-$C_{18}$ aryl), or a secondary, tertiary or quaternary phosphonium cation (e.g., $PR^b_4{}^+$ wherein each $R^b$ is independently hydrogen, $C_1$-$C_{12}$ alkyl or $C_6$-$C_{18}$ aryl), R is a monovalent $C_1$-$C_{40}$ hydrocarbon group, n is an integer of 2 to 4, and $Y^1$ is a single bond or an oxygen atom, a compound of the formula $A^3$-$Ad^1$-$A^4$-$(Ad^2$-$A^5)_l$ wherein $A^5$ is a monovalent or divalent $C_1$-$C_{40}$ hydrocarbon group, $A^4$ is a divalent $C_1$-$C_{40}$ hydrocarbon group, each of $Ad^1$ and $Ad^2$ is independently an acid anhydride group selected from —$SO_2$—O—$SO_2$—, —$SO_2$—O—CO— and —CO—O—$SO_2$—, and l is 0 or 1, provided that when l is 0, -$(Ad^2$-$A^5)_l$ is a hydrogen atom or a bond between $A^4$ and $A^5$, in which $A^5$ is a divalent hydrocarbon group or a single bond, aminosulfonic esters having the formula $R_aR_bN$-A-$SO_3R_c$, wherein $R_a$ and $R_b$ are each independently hydrogen, $C_1$-$C_{12}$ alkyl, $C_6$-$C_{22}$ aryl, $C_7$-$C_{19}$ alkylaryl or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is hydrogen, and A is $C_1$-$C_{12}$ alkyl, $C_6$-$C_{18}$ aryl, or $C_{17}$-$C_{19}$ alkylaryl (e.g., compounds such as N-(2-hydroxyethyl) piperazine-N'-3-propanesulfonic acid, 1,4,-piperazinebis (ethanesulfonic acid), and 5-dimethylamino-1-napthalenesulfonic acid), ammonium sulfonic esters of the formula $R_aR_bR_cN^+A$-$SO_3^-$, wherein $R_a$, $R_b$, are each independently hydrogen, $C_1$-$C_{12}$ alkyl, $C_1$-$C_{12}$ aryl, $C_7$-$C_{19}$ alkylaryl, or $R_a$ and $R_b$, either singly or in combination, form an aromatic or non-aromatic heterocyclic compound with N (e.g., pyrrolyl, pyridinyl, pyrimidyl, pyrazinyl, carbazolyl, quinolinyl, imidazoyl, piperazinyl, oxazolyl, thiazolyl, pyrazolyl, pyrrolinyl, indolyl, purinyl, pyrrolydinyl, or the like), $R_c$ is a hydrogen, and A is $C_1$-$C_{12}$ alkyl, $C_6$-$C_{18}$ aryl, or $C_7$-$C_{19}$ alkylaryl, sulfonated polystyrene, methyl acrylate-sulfonated styrene copolymer, and combinations comprising at least one of the foregoing. Quenching agents can include a combination of compounds, for example an alkyl tosylate such as n-butyl tosylate and phosphorus acid.

An end-capping agent (also referred to as a chain stopper agent or chain terminating agent) can be included during polymerization to provide end groups. The end-capping agent (and thus end groups) are selected based on the desired properties of the polycarbonates and poly(aliphatic ester-carbonate). Exemplary end-capping agents are exemplified by monocyclic phenols such as phenol, cynaophenol, and $C_1$-$C_{22}$ alkyl-substituted phenols such as p-cumyl-phenol, resorcinol monobenzoate, and p- and tertiary-butyl phenol, monoethers of diphenols, such as p-methoxyphenol, and alkyl-substituted phenols with branched chain alkyl substituents having 8 to 9 carbon atoms, 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, mono-carboxylic acid chlorides such as benzoyl chloride, $C_1$-$C_{22}$ alkyl-substituted benzoyl chloride, toluoyl chloride, bromobenzoyl chloride, cinnamoyl chloride, and 4-nadimidobenzoyl chloride, polycyclic, mono-carboxylic acid chlorides such as trimellitic anhydride chloride, and naphthoyl chloride, functionalized chlorides of aliphatic monocarboxylic acids, such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used.

Branched polycarbonate blocks can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. Combinations comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer can become very high upon addition of the branching agent, and to avoid excess viscosity during polymerization, an increased amount of a chain stopper agent can be used, relative to the amount used when the particular branching agent is not present. The amount of chain stopper used is generally above 5 mole percent and less than 20 mole percent compared to the bisphenol monomer.

Such branching agents include aromatic triacyl halides, for example triacyl chlorides of formula (20)

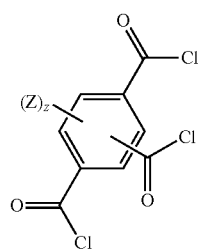

(20)

wherein Z is a halogen, $C_{1-3}$ alkyl, $C_{1-3}$ alkoxy, $C_{7-12}$ arylalkylene, $C_{7-12}$ alkylarylene, or nitro, and z is 0 to 3; a tri-substituted phenol of formula (21)

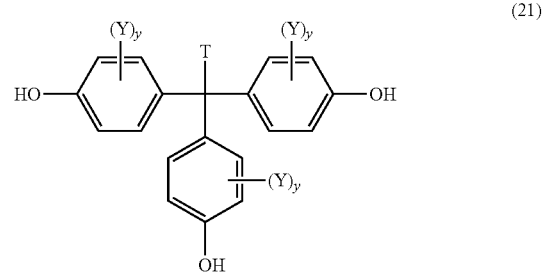

(21)

wherein T is a $C_{1-20}$ alkyl, $C_{1-20}$ alkoxy, $C_{7-12}$ arylalkyl, or $C_{7-12}$ alkylaryl, Y is a halogen, $C_{1-3}$ alkyl, $C_{1-3}$ alkoxy, $C_{7-12}$ arylalkyl, $C_{7-12}$ alkylaryl, or nitro, s is 0 to 4; or a compound of formula (22) (isatin-bis-phenol).

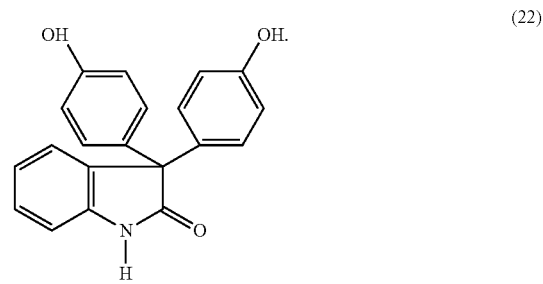 [SMILES: O=C1Nc2ccccc2C1(c1ccc(O)cc1)c1ccc(O)cc1]

(22)

Examples of specific branching agents that are particularly effective in the compositions include trimellitic trichloride (TMTC), tris-p-hydroxyphenylethane (THPE), and isatin-bis-phenol.

The amount of the branching agents used in the manufacture of the polymer will depend on a number of considerations, for example the type of $R^1$ groups, the amount of chain stopper, e.g., cyanophenol, and the desired molecular weight of the polycarbonate. In general, the amount of branching agent is effective to provide 0.1 to 10 branching units per 100 $R^1$ units, specifically 0.5 to 8 branching units per 100 $R^1$ units, and more specifically 0.75 to 5 branching units per 100 $R^1$ units. For branching agents having formula (20), the branching agent is present in an amount to provide 0.1 to 10 triester branching units per 100 $R^1$ units, specifically 0.5 to 8, and more specifically 0.75 to 5 triester branching units per 100 $R^1$ units. For branching agents having formula (21), the branching agent is present in an amount effective to provide 0.1 to 10 triphenyl carbonate branching units per 100 $R^1$ units, specifically 0.5 to 8, and more specifically 2.5 to 3.5 triphenylcarbonate units per 100 $R^1$ units. In some embodiments, a combination of two or more branching agents can be used. Alternatively, the branching agents can be added at a level of 0.05 to 2.0 wt. %.

The non-fluorinated sulfonate salt flame retardant comprises salts of $C_{6-20}$ aromatic sulfonates such as sodium benzene sulfonate, sodium toluene sulfonate (NaTS), and the like, salts of $C_{6-20}$ aromatic sulfone sulfonates such as potassium diphenylsulfone sulfonate (KSS), and the like and combinations of the foregoing. In one embodiment the non-fluorinated sulfonate salt flame retardant comprises sodium toluene sulfonate and potassium diphenylsulfone sulfonate.

The composition further comprises a polysiloxane. The polysiloxane can be linear or cyclic siloxane having the general formula $(R_2SiO)_y$, wherein R is a monovalent, linear or cyclic, hydrocarbon having from 1 to 18 carbon atoms and y is a number from 3 to 12. Examples of suitable siloxanes include, but are not limited to, poly(methylphenylsiloxane), poly(methylsiloxane), octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane, octaphenylcyclotetrasiloxane, and the like.

The thermoplastic composition can include various additives ordinarily incorporated into polymer compositions of this type, with the proviso that the additive(s) are selected so as to not significantly adversely affect the desired properties of the thermoplastic composition, in particular flame retardance, melt flow, ductility and transparency. Such additives can be mixed at a suitable time during the mixing of the components for forming the composition. Additives include antioxidants, heat stabilizers, light stabilizers, ultraviolet (UV) light stabilizers, plasticizers, lubricants, mold release agents, antistatic agents, colorants, surface effect additives, radiation stabilizers, flame retardants, and anti-drip agents. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0.01 to 5 wt. %, based on the total weight of the polycarbonate composition.

The branched, end capped polycarbonate is present in an amount of 30 to 45 weight percent, based on the combined weight of the branched, end capped polycarbonate and the poly(aliphatic ester-carbonate). Within this range the branched, end capped polycarbonate can be present in an amount greater than or equal to 35. Also within this range the branched, end capped polycarbonate can be present in an amount less than or equal to 45.

The total non-fluorinated sulfonate salt can be present in an amount of 0.75 weight percent to 2.00 weight percent, based on the combined weight of the branched, end capped polycarbonate and the poly(aliphatic ester-carbonate). Within this range the amount of non-fluorinated sulfonate salt can be greater than or equal to 0.85 weight percent. Also within this range the amount of non-fluorinated sulfonate salt can be less than or equal to 1.5 weight percent.

The polysiloxane can be present in an amount of 0.2 to 0.6 weight percent, based on the combined weight of the branched, end capped polycarbonate and the poly(aliphatic ester-carbonate). Within this range polysiloxane can be present in an amount greater than or equal to 0.3 weight percent. Also within this range the polysiloxane can be present in an amount less than or equal to 0.5 weight percent.

The polycarbonate compositions can be manufactured by various methods known in the art. For example, powdered polycarbonate, and other optional components are first blended, optionally with any fillers, in a high speed mixer or by hand mixing. The blend is then fed into the throat of a twin-screw extruder via a hopper. Alternatively, at least one of the components can be incorporated into the composition by feeding it directly into the extruder at the throat and/or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

Flammability tests were performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as HB, V0, UL94 V1, V2, VA and/or VB.

The data were also analyzed by calculation of the average flame out time, standard deviation of the flame out time, as the total number of drips, and using statistical methods to convert that data to a prediction of the probability of first time pass, or "p(FTP)", that a particular sample formulation would achieve a V0 "pass" rating in the conventional UL94 testing of 5 bars. p(FTP) will be as close to 1 as possible, for example greater than 0.9 and more specifically greater than 0.95, for maximum flame-retardant performance in UL testing.

Shaped, formed, or molded articles comprising the polycarbonate compositions are also provided. The polycarbonate compositions can be molded into useful shaped articles by a variety of methods, such as injection molding, extrusion, rotational molding, blow molding and thermoforming. Some example of articles include computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like.

The thermoplastic compositions are further illustrated by the following non-limiting examples.

EXAMPLES

The following components are used in the examples. Unless specifically indicated otherwise, the amount of each component is in weight percent in the following examples, based on the combined weight of the branched, end capped polycarbonate and poly(aliphatic ester-carbonate).

TABLE 1

| Material | Description |
| --- | --- |
| PSi | A polyphenylmethyl siloxane commercially available from Momentive as TSF437. |
| LMW PEC | A poly(aliphatic ester carbonate) having a weight average molecular weight of 15,000 to 25,000, end capped with phenol and commercially available from SABIC |
| HMW PEC | A poly(aliphatic ester carbonate) having a weight average molecular weight of 30,000 to 40,000, end capped with phenol and commercially available from SABIC |
| PC | An optical quality polycarbonate having a weight average molecular weight of 17,000 to 19,000 and commercially available from SABIC |

TABLE 1-continued

| Material | Description |
|---|---|
| BEPC | A branched end capped polycarbonate having a branching level of 8.5 mol % and end capped with 4-hydroxybenzonitrile and commercially available from SABIC. |
| NaTS | Sodium p-toluene sulfonate commercially available from Arichem, LLC |
| KSS | Potassium diphenyl sulfone sulfonate commercially available from Metropolitan Exichem Ltd. |

All thermoplastic compositions except where indicated are compounded on a Werner & Pfleiderer co-rotating twin screw extruder (Length/Diameter (L/D) ratio=30/1, vacuum port located near die face). The twin-screw extruder had enough distributive and dispersive mixing elements to produce good mixing between the polymer compositions. The compositions are subsequently molded according to ISO 294 on a Husky or BOY injection-molding machine. Compositions are compounded and molded at a temperature of 285 to 330° C., though it will be recognized by one skilled in the art that the method can not be limited to these temperatures.

Physical measurements were made using the tests and test methods described above.

5 grams of potassium diphenyl sulfone sulfonate and 17.5 grams of sodium p-toluene sulfonate were combined in 250 grams of water to form a masterbatch (referred to below as KSS/NaTS MB). Amounts shown in the following tables are amounts of the masterbatch in weight percent based on the combined weight of the branched end capped polycarbonate and polyester polycarbonate copolymer(s).

Examples 1-10

The compositions shown in Table 2 were made as described above. The KSS/NaTs masterbatch was added at the main feeder. The compositions additionally contained 0.3 weight percent of additives, based on the combined weight of the branched, end capped polycarbonate and poly(aliphatic ester-carbonate). The data in Table 2 demonstrates the complexity of attaining a combination of flame retardance and ductility. A comparison of Examples 4 and 5 show that a small change in composition yields a remarkable change in flame retardance. While Example 4 and 5 would seem to indicate that at least 35 weight percent of branched end capped polycarbonate is required for flame retardance, Examples 8 shows an alternate formulation which can also attain good flame retardance. Examples 9 and 10 demonstrate that the type of polycarbonate used in the composition is important to ductility.

TABLE 2

|  | 1* | 2* | 3* | 4* | 5 | 6* | 7 | 8 | 9* | 10* |
|---|---|---|---|---|---|---|---|---|---|---|
| PolySi | 0.4 | 0.4 | 0.4 | 0.4 | 0.4 | 0.4 | 0.4 | 0.4 | 0.4 | 0.4 |
| LMW PEC | 95 | 85 | 75 | 70 | 65 | 65 | 25 | 30 | 50 | 50 |
| HMW PEC | — | — | — | 0 | — | — | 40 | 40 | — | — |
| PC | — | — | — | — | — | — | — | — | 20 | 25 |
| BEPC | 5 | 15 | 25 | 30 | 35 | 35 | 35 | 30 | 30 | 25 |
| KSS/NaTS MB | 1 | 1 | 1 | 1 | 1 | — | 1 | 1 | 1 | 1 |
| MVR (cm$^3$/10 min) | 51.4 | 45.2 | 34 | 39.6 | 25.8 | 27.3 | 21.8 | 19.7 | 41.7 | 47.4 |
| NI Ductility (%) | 100 | 100 | 100 | 20 | 40 | 40 | 100 | 100 | 0 | 20 |
| MAI ductility (%) | 100 | 100 | 100 | 100 | 100 | 100 | 100 | 100 | 80 | 80 |
| Light transmittance (%) | 90 | 89.9 | 89.8 | 90.1 | 89.8 | 89.8 | 90.2 | 90.2 | 90 | 90 |
| Haze (%) | 1.2 | 1 | 1.1 | 1 | 1.3 | 1.2 | 1.1 | 1.1 | 1 | 1 |
| p(FTP): V0‡ 3.0 mm | 0: fail | 0: fail | 0.4: fail | 0.2: fail | 1: pass | 0: fail | — | — | 0.99: pass | 0.15: fail |
| p(FTP): V1‡ 3.0 mm | 0: fail | 0: fail | 0.6: fail | 0.3: fail | 1: pass | 0: fail | — | — | 1: pass | 03: fail |
| p(FTP): V0‡ 2.5 mm | 0: fail | 0: fail | 0: fail | 0.1: fail | 1: pass | 0: fail | 0.8: pass | 1.0: pass | 0.1: fail | 0: fail |
| p(FTP): V1‡ 2.5 mm | 0: fail | 0: fail | 0: fail | 0.1: fail | 1: pass | 0: fail | 1: pass | 1: pass | 0.1: fail | 0: fail |

*Comparative Example
‡UL94 standard

Examples 11-14

The compositions shown in Table 3 were made as described above. The compositions additionally comprised 0.4 weight percent of additives (stabilizer and mold release), based on the combined weight of the branched, end capped polycarbonate and poly(aliphatic ester-carbonate). Examples 11 and 14 are comparative and replace the non-fluorinated sulfonate salts with a fluorinated sulfonate salt. The fluorinated sulfonate salt (Rimar salt) fails to demonstrate ductility despite showing good flame retardance.

TABLE 3

|  | 11* | 12 | 13 | 14* |
|---|---|---|---|---|
| PSi | 0.5 | 0.4 | 0.4 | 0.5 |
| LMW PEC | 30 | 30 | 65 | 65 |
| HMW PEC | 40 | 40 | — | — |
| BEPC | 30 | 30 | 35 | 40 |
| Rimar | 0.08 | | | 0.08 |
| KSS/NaTS MB | — | 1 | 1 | — |
| MVR (cm$^3$/10 min) | 64.6 | 15.6 | 34.7 | 38.6 |
| NI Ductility (%) | 0 | 100 | 40 | 0 |
| MAI ductility (%) | 40 | 100 | 80 | 20 |
| Light transmittance (%) | 90.5 | 89.9 | 90.2 | 90.3 |
| Haze (%) | 1.4 | 1.7 | 1.4 | 1.6 |
| p(FTP): V0‡ 3.0 mm | 1: pass | 0.95: pass | 1: pass | 1: pass |
| p(FTP): V1‡ 3.0 mm | 1: pass | 1: pass | 1: pass | 1: pass |
| p(FTP): V0‡ 2.5 mm | 0.8: pass | 0.98: pass | 0.5: fail | 1: pass |
| p(FTP): V1‡ 2.5 mm | 1: pass | 1.0: pass | 1: pass | 1: pass |

‡UL94 standard

Examples 15-23

The compositions shown in Table 4 were made as described above. The compositions further comprises 0.4 weight percent of additives (stabilizer and mold release), based on the combined weight of the branched, end capped polycarbonate and poly(aliphatic ester-carbonate). Table 4, in combination with the preceding data shows the importance of having at least 35 weight percent of branched, end capped polycarbonate.

TABLE 4

|  | 15* | 16* | 17 | 18 | 19 | 20* | 21 | 22 | 23 |
|---|---|---|---|---|---|---|---|---|---|
| PolySi | 0.4 | 0.4 | 0.4 | 0.4 | 0.4 | 0.4 | 0.4 | 0.4 | 0.4 |
| LMW PEC | 31 | 14 | 43 | 30 | 14 | 43 | 30 | 43 | 14 |
| HMW PEC | 49 | 66 | 27 | 40 | 56 | 37 | 30 | 17 | 46 |
| BEPC | 20 | 20 | 30 | 30 | 30 | 20 | 40 | 40 | 40 |
| KSS/NaTS MB | 1 | 1 | 1 | 1 | 1 | 1 | 1 | 1 | 1 |
| MVR (cm$^3$/10 min) | 13.8 | 10.5 | 22.4 | 17.3 | 10.6 | 21.1 | 17.2 | 21.9 | 11.9 |
| NI Ductility (%) | 100 | 100 | 100 | 100 | 100 | 100 | 100 | 0 | 80 |
| MAI ductility (%) | 100 | 100 | 100 | 100 | 100 | 100 | 100 | 100 | 100 |
| Light transmittance (%) | 85.3 | 86.4 | 87.2 | 87.7 | 87.7 | 88.5 | 88.8 | 88.5 | 88.5 |
| Haze (%) | 2.3 | 2.5 | 1.9 | 1.8 | 1.9 | 1.5 | 1.3 | 1.4 | 1.4 |
| p(FTP): V0‡ 3.0 mm | 0: fail | 0: fail | 0.6: pass | 0.7: pass | 0.7: pass | 0: fail | 1.0: pass | 1.0: pass | 1.0: pass |
| p(FTP): V1‡ 3.0 mm | 0: fail | 0.1: fail | 1.0: pass | 1.0: pass | 1.0: pass | 0: fail | 1.0: pass | 1.0: pass | 1.0: pass |
| p(FTP): V0‡ 2.5 mm | 0: fail | 0: fail | 0.2: fail | 0.2: fail | 0.8: pass | 0: fail | 0.9: pass | 0.8: pass | 1.0: pass |
| p(FTP): V1‡ 2.5 mm | 0.1: fail | 0.8: fail | 1.0: pass | 1.0: pass | 1.0: pass | 0.2: fail | 1.0: pass | 1.0: pass | 1.0: pass |

*Comparative Example
‡UL94 standard

Embodiment 1

A thermoplastic composition comprising: 35 to 45 weight percent of a branched, end capped polycarbonate; 55 to 65 weight percent of a poly(aliphatic ester-carbonate) having a weight average molecular weight of 15,000 to 25,000; a non-flourinated sulfonate salt flame retardant; and a polysiloxane, wherein weight percent is based on the combined weight of the branched, end capped polycarbonate and poly(aliphatic ester-carbonate).

Embodiment 2

The composition of Embodiment 1, wherein the composition has a melt volume flow rate of 15 to 40 cubic cm/10 min measured at 300° C. under a load of 1.2 kg, according to ASTM D 1238 at 6 minutes.

Embodiment 3

The composition of Embodiment 1 or 2, wherein the composition has a multi-axial impact ductility greater than or equal to 80% at 23° C. determined accordingly to ASTM D3763 at 23° C. and 3.2 mm.

Embodiment 4

The composition of any one of Embodiments 1 to 3, wherein the composition has flame retardance of V1 according to UL94 at a thickness of 3.0 millimeters.

Embodiment 5

The composition of any one of Embodiments 1 to 3, wherein the composition has a flame retardance of V0 according to UL94 at a thickness of 3.0 millimeters.

Embodiment 6

The composition of any one of Embodiments 1 to 5, wherein the end-capping agents are selected from at least one of the following: phenol or a phenol containing one or more substitutions with at least one of the following: aliphatic groups, olefinic groups, aromatic groups, halogens, ester groups, cyano groups, and ether groups.

Embodiment 7

The composition of Embodiment 6 wherein the end-capping agents are selected from at least one of the following: phenol, p-t-butylphenol, cyanophenol, and p-cumylphenol.

Embodiment 8

The composition of any one of Embodiments 1 to 7, wherein the polycarbonate of said composition has a branching level greater than or equal to 3 mol %.

Embodiment 9

The composition of any one of Embodiments 1 to 8, wherein the flame-retardant comprises potassium diphenylsulfone sulfonate and sodium toluene sulfonate.

Embodiment 10

The composition of any one of Embodiments 1 to 9, wherein the composition has a haze value less than or equal to 1.5% and a light transmittance greater than or equal to 85% at a thickness of 3.2 mm as determined by ASTM D1003.

Embodiment 11

A thermoplastic composition comprising: 30 to 45 weight percent of a branched, end capped polycarbonate, 55 to 70 weight percent of a combination of a first poly(aliphatic ester-carbonate) having a weight average molecular weight of 15,000 to 25,000 and a second poly(aliphatic ester-carbonate) having a weight average molecular weight of 30,000 to 40,000, a non-flourinated sulfonate salt flame retardant and a polysiloxane wherein the weight ratio of the first poly(aliphatic ester-carbonate) to the second poly(aliphatic ester-carbonate) is 3:4 to 5:2 and weight percent is based on the combined weight of the branched, end capped polycarbonate and poly(aliphatic ester-carbonate).

Embodiment 12

The composition of Embodiment 11, wherein the composition has a melt volume flow rate of 15 to 20 cubic cm/10 min measured at 300° C. under a load of 1.2 kg, according to ASTM D 1238 at 6 minutes.

Embodiment 13

The composition of Embodiment 11 or 12, wherein the composition has a multi-axial impact ductility greater than or equal to 80% at 23° C. determined accordingly to ASTM D3763 at 23° C. and 3.2 mm.

Embodiment 14

The composition of any one of Embodiments 11 to 13, wherein the end-capping agents are selected from at least one of the following: phenol or a phenol containing one or more substitutions with at least one of the following: aliphatic groups, olefinic groups, aromatic groups, halogens, ester groups, cyano groups, and ether groups.

Embodiment 15

The composition of Embodiment 14 wherein the end-capping agents are selected from at least one of the following: phenol, p-t-butylphenol, cyanophenol, and p-cumylphenol.

Embodiment 16

The composition of any one of Embodiments 11 to 15, wherein the polycarbonate of said composition has a branching level greater than or equal to 3 mol %.

Embodiment 17

The composition of any one of Embodiments 11 to 16, wherein the flame-retardant comprises potassium diphenylsulfone sulfonate and sodium toluene sulfonate.

Embodiment 18

The composition of any one of Embodiments 11 to 17, wherein the composition has a a haze value less than or equal to 1.5% and a light transmittance greater than or equal to 85% at a thickness of 3.2 mm as determined by ASTM D1003.

Embodiment 19

The composition of any one of Embodiments 11 to 18, wherein the composition has flame retardance of V1 according to UL94 at a thickness of 3.0 millimeters.

Embodiment 20

The compositions of any one of Embodiments 11 to 18, wherein the composition has a flame retardance of V0 according to UL94 at a thickness of 3.0 millimeters.

The singular forms "a," "an," and "the" include plural referents unless the context clearly dictates otherwise. "Or" means "and/or." The modifier "about" used in connection with a quantity is inclusive of the stated value and has the meaning dictated by the context (e.g., includes the degree of error associated with measurement of the particular quantity). The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. The suffix "(s)" is intended to include both the singular and the plural of the term that it modifies, thereby including at least one of that term (e.g., the colorant(s) includes at least one colorants). "Optional" or "optionally" means that the subsequently described event or circumstance can or can not occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

As used herein, the term "hydrocarbyl" and "hydrocarbon" refers broadly to a substituent comprising carbon and hydrogen, optionally with 1 to 3 heteroatoms, for example, oxygen, nitrogen, halogen, silicon, sulfur, or a combination thereof; "alkyl" refers to a straight or branched chain, saturated monovalent hydrocarbon group; "alkylene" refers to a straight or branched chain, saturated, divalent hydrocarbon group; "alkylidene" refers to a straight or branched chain, saturated divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkenyl" refers to a non-aromatic cyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Exemplary groups that can be present on a "substituted" position include, but are not limited to, cyano; hydroxyl; nitro; azido; alkanoyl (such as a $C_{2-6}$ alkanoyl group such as acyl); carboxamido; $C_{1-6}$ or $C_{1-3}$ alkyl, cycloalkyl, alkenyl, and alkynyl (including groups having at least one unsaturated linkages and from 2 to 8, or 2 to 6 carbon atoms); $C_{1-6}$ or $C_{1-3}$ alkoxys; $C_{6-10}$ aryloxy such as phenoxy; $C_{1-6}$ alkylthio; $C_{1-6}$ or $C_{1-3}$ alkylsulfinyl; C1-6 or $C_{1-3}$ alkylsulfonyl; aminodi($C_{1-6}$ or $C_{1-3}$) alkyl; $C_{6-12}$ aryl having at least one aromatic rings (e.g., phenyl, biphenyl, naphthyl, or the like, each ring either substituted or unsubstituted aromatic); $C_{7-19}$ alkylenearyl having 1 to 3 separate or fused rings and from 6 to 18 ring carbon atoms, with benzyl being an exemplary arylalkyl; or arylalkoxy having 1 to 3 separate or fused rings and from 6 to 18 ring carbon atoms, with benzyloxy being an exemplary arylalkoxy.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A thermoplastic composition comprising:
   35 to 45 weight percent of a branched, end capped polycarbonate;
   55 to 65 weight percent of a poly(aliphatic ester-carbonate) having a weight average molecular weight of 15,000 to 25,000;
   a non-flourinated sulfonate salt flame retardant; and
   a polysiloxane, wherein weight percent is based on the combined weight of the branched, end capped polycarbonate and poly(aliphatic ester-carbonate).

2. The composition of claim 1, wherein the composition has a melt volume flow rate of 15 to 40 cubic cm/10 min measured at 300° C. under a load of 1.2 kg, according to ASTM D 1238 at 6 minutes.

3. The composition of claim 1, wherein the composition has a multi-axial impact ductility greater than or equal to 80% at 23° C. determined accordingly to ASTM D3763 at 23° C. and 3.2 mm.

4. The composition of claim 1, wherein the composition has flame retardance of V1 according to UL94 at a thickness of 3.0 millimeters.

5. The composition of claim 1, wherein the composition has a flame retardance of V0 according to UL94 at a thickness of 3.0 millimeters.

6. The composition of claim 1, wherein the end-capping agents are selected from at least one of the following: phenol or a phenol containing one or more substitutions with at least one of the following: aliphatic groups, olefinic groups, aromatic groups, halogens, ester groups, cyano groups, and ether groups.

7. The composition of claim 6 wherein the end-capping agents are selected from at least one of the following: phenol, p-t-butylphenol, cyanophenol, and p-cumylphenol.

8. The composition of claim 1, wherein the polycarbonate of said composition has a branching level greater than or equal to 3 mol %.

9. The composition of claim 1, wherein the flame-retardant comprises potassium diphenylsulfone sulfonate and sodium toluene sulfonate.

10. The composition of claim 1, wherein the composition has a haze value less than or equal to 1.5% and a light transmittance greater than or equal to 85% at a thickness of 3.2 mm as determined by ASTM D1003.

11. A thermoplastic composition comprising: 30 to 45 weight percent of a branched, end capped polycarbonate, 55 to 70 weight percent of a combination of a first poly(aliphatic ester-carbonate) having a weight average molecular weight of 15,000 to 25,000 and a second poly(aliphatic ester-carbonate) having a weight average molecular weight of 30,000 to 40,000, a non-flourinated sulfonate salt flame retardant and a polysiloxane wherein the weight ratio of the first poly(aliphatic ester-carbonate) to the second poly(aliphatic ester-carbonate) is 3:4 to 5:2 and weight percent is based on the combined weight of the branched, end capped polycarbonate and poly(aliphatic ester-carbonate).

12. The composition of claim 11, wherein the composition has a melt volume flow rate of 15 to 20 cubic cm/10 min measured at 300° C. under a load of 1.2 kg, according to ASTM D 1238 at 6 minutes.

13. The composition of claim 11, wherein the composition has a multi-axial impact ductility greater than or equal to 80% at 23° C. determined accordingly to ASTM D3763 at 23° C. and 3.2 mm.

14. The composition of claim 11, wherein the end-capping agents are selected from at least one of the following: phenol or a phenol containing one or more substitutions with at least one of the following: aliphatic groups, olefinic groups, aromatic groups, halogens, ester groups, cyano groups, and ether groups.

15. The composition of claim 14 wherein the end-capping agents are selected from at least one of the following: phenol, p-t-butylphenol, cyanophenol, and p-cumylphenol.

16. The composition of claim 11, wherein the polycarbonate of said composition has a branching level greater than or equal to 3 mol %.

17. The composition of claim 11, wherein the flame-retardant comprises potassium diphenylsulfone sulfonate and sodium toluene sulfonate.

18. The composition of claim 11, wherein the composition has a haze value less than or equal to 1.5% and a light transmittance greater than or equal to 85% at a thickness of 3.2 mm as determined by ASTM D1003.

19. The composition of claim 11, wherein the composition has flame retardance of V1 according to UL94 at a thickness of 3.0 millimeters.

20. The compositions of claim 11, wherein the composition has a flame retardance of V0 according to UL94 at a thickness of 3.0 millimeters.

* * * * *